No. 839,841. PATENTED JAN. 1, 1907.
F. B. HAYS.
SCALE RECORDER.
APPLICATION FILED JULY 30, 1906.

2 SHEETS—SHEET 2.

Witnesses
Frank A. Fahle
Thomas W. McMeans

Inventor
Franklin Busch Hays
By Bradford & Hood
Attorneys

UNITED STATES PATENT OFFICE.

FRANKLIN BUSCH HAYS, OF INDIANAPOLIS, INDIANA.

SCALE-RECORDER.

No. 839,841.  Specification of Letters Patent.  Patented Jan. 1, 1907

Application filed July 30, 1906. Serial No. 328,373.

*To all whom it may concern:*

Be it known that I, FRANKLIN BUSCH HAYS, a citizen of the United States, residing at Indianapolis, in the county of Marion and State of Indiana, have invented certain new and useful Improvements in Scale-Recorders, of which the following is a specification.

The object of my invention is to produce a simple device by means of which weights indicated by a scale may be automatically recorded.

The accompanying drawings illustrate my invention.

Figure 1:
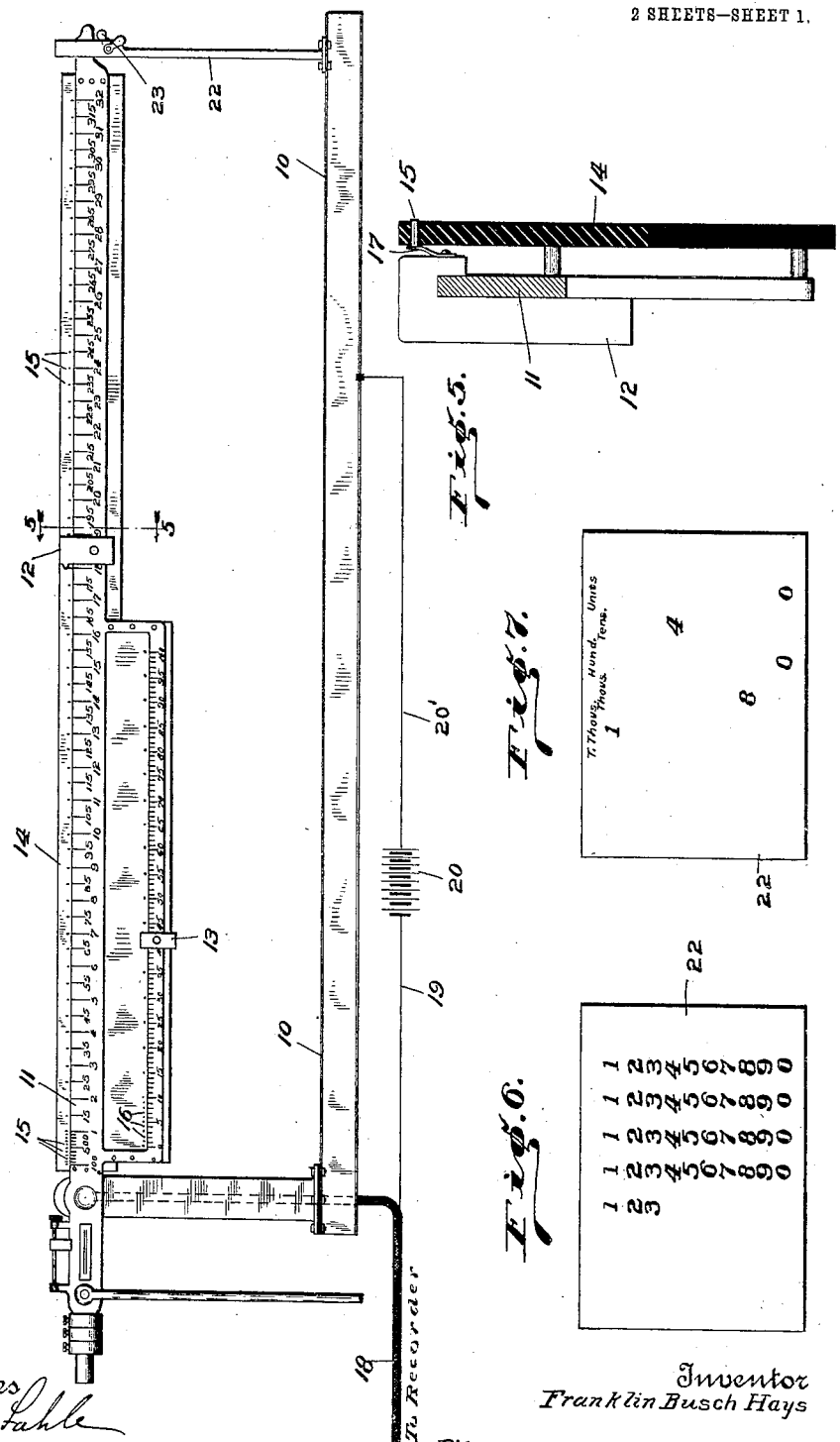
Figure 2:
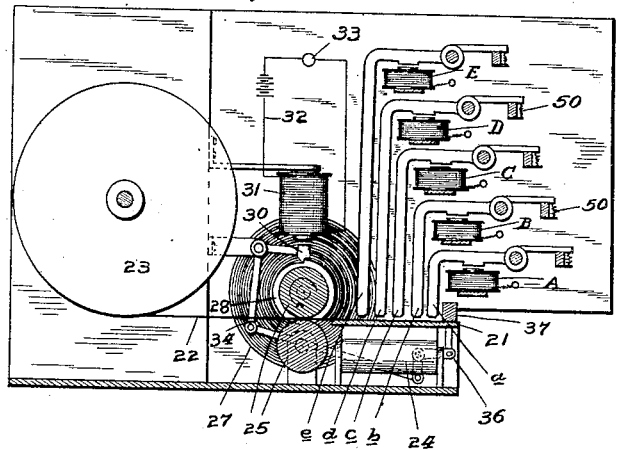
Figure 3:
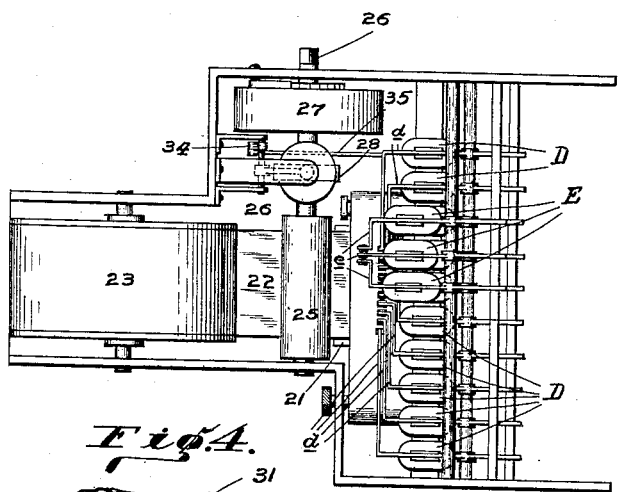
Figure 4:
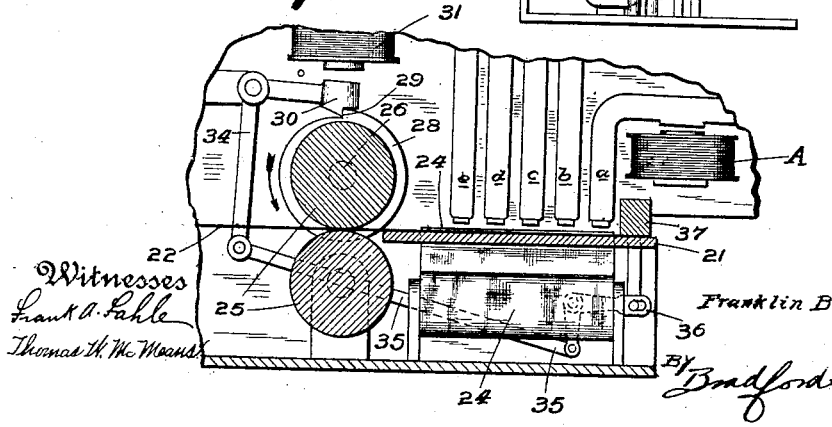

Figure 1 is a side elevation of a scale-beam constructed in accordance with my invention; Fig. 2, a central vertical section of the recorder; Fig. 3, a partial plan thereof; Fig. 4, an enlarged sectional detail; Fig. 5, an enlarged section on line 5 5 of Fig. 1; Fig. 6, a view showing the arrangement of the printing-arms, and Fig. 7 a diagram showing the method of recording weights indicated by the scale-beam.

In the drawings, 10 indicates the frame of an ordinary scale-beam upon which the scale-beam 11 is balanced in the usual well-known manner and provided with counterpoises 12 and 13. Secured to the beam 11 and substantially coextensive therewith is a plate 14, preferably of insulating material, which forms a support for a plurality of contact-points 15 and 16, which may be engaged in succession by a spring-finger 17, one carried by each of the counterpoises 12 and 13. Leading to the plate 14 is a cable of electrical conductors 18, which cable is composed of as many electrical conductors as are necessary to connect the several terminals 15 and 16 with the actuating-electromagnets presently to be described. Said cable also carries a wire 19, which connects with a suitable battery 20' and from thence by wire 21 to the guide-standard 22, so that when the usual pawl 23 is thrown up to engage the end of the beam 11 and hold it in position the circuits will be automatically established.

The recording instrument comprises several series A, B, C, D, and E of electromagnets, each series consisting of ten magnets, except possibly the last, which need only be of a sufficient number to reach the capacity of the scale-beam. For instance, the capacity of the beam shown is thirty-two thousand pounds, and consequently the final series E, which controls the tens-of-thousands records, need only be of three coils. Each magnet of the series A is adapted to actuate an arm $a$, which at its lower end carries a printing-type, and similarly the magnets of the series B, C, D, and E control arms $b$, $c$, $d$, and $e$, respectively, each of which is provided at its lower end with a proper printing-type. The several arms have their type ends brought as close together as convenient above a table 21, over which extends a record-strip 22, said record-strip being fed from a storage-drum 23. An ordinary inking-ribbon 24 is arranged between the table 21 and the type-arms above the record-strip 22. In order to feed the record-strip across the table 21 automatically, I provide between the table and the storage-drum a pair of friction-rollers 25, between which the record-strip is fed, and one of these feeding-rollers is carried by a shaft 26, which is normally urged in one direction by a suitable motor-spring 27. Shaft 26 carries a collar 28, provided with a shoulder 29, normally engaged by a detent 30 to normally prevent rotation of shaft 26. The detent 30 is arranged within the field of an electromagnet 31, which is placed in a suitably-energized circuit 32, provided with a push-button 33. Detent 30 is carried by one end of a lever 34, and the opposite end of said lever is connected by a link 35 and a lever 36 with a bar 37, arranged above one end of platform 21.

Those wires in cable 18 which are connected to the successively-arranged terminals 16 opposite the positions occupied by the counterpoise 13 to indicate weights from "0" to one hundred pounds are connected to the proper coils of the series A, B, and C. For instance, the point opposite "75" on that portion of the beam traversed by counterpoise 13 will be connected by a single wire with the seventh coil of series B and also with the fifth coil of series A. Likewise the point opposite "135" on that portion of the beam 11 traversed by the counterpoise 12 will be connected by a single wire with the first coil of series E, the third coil of series D, and the fifth coil of series C. Similarly, the several contact-points 15 and 16 will be properly connected to the particular coils of each series necessary to produce energization of the proper magnets of each series.

The operation is as follows: The counterpoises 12 and 13 will be manipulated in the usual manner until the scale-beam 11 is balanced with the weight on the platform of the scale. (Not shown.) Thereupon the operator turns the pawl 23 into engagement with the free end of the scale-beam, thus establishing the circuit through battery 20 and the recording-instrument, and the corresponding magnets of the recording instruments are energized. For instance, the parts in the positions shown in Fig. 1 indicate the weight "18,040," and consequently the first coil of series E, the eighth coil of series D, the tenth coil of series C, the fourth coil of series B, and the tenth coil of series A will be energized, and the corresponding type-arms will be drawn down so as to drive their type ends toward the recording-strip on the platform 21, and thus produce an imprint therein, according to the arrangement shown in Fig. 7. The pawl 23 will then be returned to normal position, whereupon the actuated type-arms will be drawn back by their respective springs 50. Thereupon the operator will actuate button 33 to momentarily energize magnet 31, thus withdrawing detent 30 from engagement with shoulder 29 and moving member 37 upward away from table 21. Immediately the spring 27 serves to drive the feed-rollers 25 in the direction indicated by the arrow in Fig. 4, and the record-strip 22 is fed forward across table 21 beneath bar 37, the detent 30 being held up by flange 28 until shoulder 29 again approaches the detent. When the detent 30 returns to its normal position, bar 37 will be lowered upon the record-strip, and thus present an edge over which the projected end of the record-strip may be torn.

I claim as my invention—

1. The combination, with a scale-beam and a counterpoise movable along the same, of a plurality of contact-points adapted to be successively engaged by the counterpoise, a recording instrument comprising a plurality of series of electromagnets in circuit with corresponding ones of said series of contact-points, and a plurality of series of recording mechanisms each operated by one of said electromagnets.

2. The combination, with a scale-beam and a counterpoise movable along the same, of a plurality of contact-points adapted to be successively engaged by the counterpoise, a recording instrument comprising a plurality of series of electromagnets in circuit with corresponding ones of said series of contact-points, a plurality of series of recording mechanisms each operated by one of said electromagnets, a storage-roll, a record-strip carried by said storage-roll and passed into position to be operated upon by said recording mechanisms, a feeding-motor engaging said record-strip, means for normally restraining said motor, and an electromagnet for controlling said restraining means.

3. The combination, with a scale-beam, of a recording instrument comprising a plurality of series of independent electromagnetic recording devices, a plurality of contact members one for each desired division of the scale-beam, a plurality of circuits containing said contact-points and corresponding electromagnetic recording devices of the several series, and means for controlling said circuits.

4. The combination, with a scale-beam, of a recording instrument comprising a plurality of series of independent electromagnetic recording devices, a plurality of contact members one for each desired division of the scale-beam, a plurality of circuits containing said contact-points and corresponding electromagnetic recording devices of the several series, and means controlled by the weight-indicating devices of the scale-beam for controlling said circuits.

5. The combination, with a scale-beam, of a recording instrument comprising a plurality of series of independent electromagnetic recording devices, a plurality of contact members one for each desired division of the scale-beam, a plurality of circuits containing said contact members and corresponding electromagnetic recording devices of the several series, means for controlling said circuits, a recording-strip, feeding means therefor, a spring-motor for actuating said feeding means, and an electrically-controlled detent for intermittently permitting the operation of said feeding means.

6. The combination, with a scale-beam, of a recording instrument comprising a plurality of series of independent electromagnetic recording devices, a plurality of contact members one for each desired division of the scale-beam, a plurality of circuits containing said contact members and corresponding electromagnetic recording devices of the several series, means controlled by the weight-indicating devices of the scale-beam for controlling said circuits, a recording-strip, feeding means therefor, a spring-motor for actuating said feeding means, and an electrically-controlled detent for intermittently permitting the operation of said feeding means.

7. The combination, with a scale-beam, of a recording instrument comprising a plurality of series of independent electromagnetic recording devices, a plurality of contact members one for each desired division of the scale-beam, a plurality of circuits containing said contact members and corresponding electromagnetic recording devices of the several series, means for controlling said circuit, a record-strip, feeding means therefor, a spring-motor for actuating said feeding means, an electrically-controlled detent for intermittently permitting the operation of said feeding means, and means controlled by said detent for correspondingly intermittently clamping and releasing the record-strip.

8. The combination, with a scale-beam, of a recording instrument comprising a plurality of series of independent electromagnetic recording devices, a plurality of contact members one for each desired division of the scale-beam, a plurality of circuits containing said contact members and corresponding electromagnetic recording devices of the several series, means controlled by the weight-indicating devices of the scale-beam for controlling said circuits, a recording-strip, feeding means therefor, a spring-motor for actuating said feeding means, an electrically-controlled detent for intermittently permitting the operation of said feeding means, and means controlled by said detent for correspondingly intermittently clamping and releasing the record-strip.

In witness whereof I have hereunto set my hand and seal, at Indianapolis, Indiana, this 29th day of June, A. D. 1906.

FRANKLIN BUSCH HAYS. [L. S.]

Witnesses:
 THOMAS W. MCMEANS,
 ARTHUR M. HOOD.